(12) United States Patent
Babicki et al.

(10) Patent No.: US 11,703,098 B2
(45) Date of Patent: Jul. 18, 2023

(54) PISTON ASSEMBLY WITH ADJUSTER

(71) Applicant: Goodrich Corporation, Charlotte, NC (US)

(72) Inventors: Kamil Babicki, Paczków (PL); Maciej Krulak, Warsaw (PL)

(73) Assignee: GOODRICH CORPORATION, Charlotte, NC (US)

( * ) Notice: Subject to any disclaimer, the term of this patent is extended or adjusted under 35 U.S.C. 154(b) by 28 days.

(21) Appl. No.: 17/343,167

(22) Filed: Jun. 9, 2021

(65) Prior Publication Data

US 2021/0388877 A1 Dec. 16, 2021

(30) Foreign Application Priority Data

Jun. 15, 2020 (PL) .......................................... 434320

(51) Int. Cl.
| | |
|---|---|
| *F16D 65/54* | (2006.01) |
| *B64C 25/44* | (2006.01) |
| *F16D 65/18* | (2006.01) |
| *F16D 121/04* | (2012.01) |
| *F16D 125/06* | (2012.01) |

(52) U.S. Cl.
CPC ............ *F16D 65/543* (2013.01); *B64C 25/44* (2013.01); *F16D 65/18* (2013.01); *F16D 2121/04* (2013.01); *F16D 2125/06* (2013.01)

(58) Field of Classification Search
CPC ...... F16D 65/18; F16D 65/186; F16D 65/543; F16D 55/40; F16D 2121/04; F16D 2125/06; B64C 25/44
See application file for complete search history.

(56) References Cited

U.S. PATENT DOCUMENTS

| | | | | |
|---|---|---|---|---|
| 3,286,795 | A | | 11/1966 | Barret et al. |
| 3,376,959 | A | * | 4/1968 | Holcomb, Jr. ........ F16D 65/543 |
| | | | | 188/196 R |
| 3,581,849 | A | * | 6/1971 | Landgraf ................. F16D 55/40 |
| | | | | 188/196 A |
| 3,844,388 | A | * | 10/1974 | Ditlinger ............... F16D 65/543 |
| | | | | 188/196 R |
| 3,903,999 | A | * | 9/1975 | Ditlinger .................. F16D 55/40 |
| | | | | 188/196 R |
| 3,949,843 | A | * | 4/1976 | Holcomb, Jr. ........ F16D 65/543 |
| | | | | 188/196 R |

(Continued)

FOREIGN PATENT DOCUMENTS

WO 2005019679 3/2005

OTHER PUBLICATIONS

EPO, Extended European Search Report dated Oct. 25, 2021 in EP Serial No. 21175653.1.

*Primary Examiner* — Vishal R Sahni
(74) *Attorney, Agent, or Firm* — Snell & Wilmer L.L.C.

(57) ABSTRACT

The present application relates to a piston assembly for engaging two selectively engageable parts. The piston assembly has a housing defining a piston cylinder and a piston. The assembly also has a piston stroke limiter. The piston stroke limiter is configured to limit the length of a return stroke of the piston from an extended stroke position and a retracted stroke position. A crushable body acts between the piston and the piston stroke limiter and is arranged to reduce in axial length when a length of an extended stroke exceeds a length of a retraction stroke to maintain the length of the return stroke.

12 Claims, 4 Drawing Sheets

(56) References Cited

U.S. PATENT DOCUMENTS

| | | | | |
|---|---|---|---|---|
| 3,958,670 | A | * | 5/1976 | Anderson ............... F16D 55/40 |
| | | | | 188/196 R |
| 3,985,670 | A | | 5/1976 | Anderson |
| 4,010,828 | A | * | 3/1977 | Ditlinger ............... F16D 65/543 |
| | | | | 188/196 P |
| 4,433,758 | A | * | 2/1984 | Crossman ............. F16D 65/543 |
| | | | | 188/196 R |
| 5,542,504 | A | * | 8/1996 | Berwanger ............. F16D 65/54 |
| | | | | 188/71.8 |
| 6,016,892 | A | * | 1/2000 | Berwanger ............. F16D 65/18 |
| | | | | 188/73.1 |
| 2009/0145701 | A1 | * | 6/2009 | Piccoli ................... F16D 65/18 |
| | | | | 188/71.8 |
| 2020/0049216 | A1 | | 2/2020 | Herrmann et al. |
| 2021/0388877 | A1 | * | 12/2021 | Babicki .................. B64C 25/44 |

* cited by examiner

PISTON ASSEMBLY WITH ADJUSTER

CROSS-REFERENCE TO RELATED APPLICATIONS

This application claims priority to, PL Application Serial No. P.434320, filed Jun. 15, 2020 and entitled "PISTON ASSEMBLY WITH ADJUSTER," which is incorporated by reference herein in its entirety for all purposes.

FIELD

The following description relates to a piston assembly with an adjuster assembly. The following description also relates to an adjuster assembly, a cartridge for an adjuster assembly, a brake system for an aircraft, and a method of assembling a piston assembly.

BACKGROUND

The following description relates to a piston assembly with an adjuster assembly. The following description also relates to an adjuster assembly, a cartridge for an adjuster assembly, a brake system for an aircraft, and a method of assembling a piston assembly.

During a braking action, wear of the surfaces of friction elements may occur over time. Such wear of the friction discs or other elements causes an increased clearance between friction surfaces of the friction elements when the brake system is disengaged. This increased clearance results in a longer stroke length of a piston or pistons required to engage the brake system, and therefore a longer engagement time To compensate for the increased clearance periodic manual adjustment of the brake system may be undertaken. Automatic adjusters are also known. One such mechanical automatic adjuster utilizes a tube on the piston and a tube expander element on a rod extending from the housing and through a head of the piston to be received in the tube. As the stroke length of the piston increases, the tube expander element attached to the housing is drawn axially along the bore of the tube and radially outwardly expands the tube to establish a new retracted position for the piston.

SUMMARY

According to an aspect of the disclosure, there is provided a piston assembly for engaging two selectively engageable parts comprising a housing defining a piston cylinder; a piston; and an adjuster assembly including a piston stroke limiter configured to limit the length of a return stroke of the piston from an extended stroke position and a retracted stroke position; and a crushable body acting between the piston and the piston stroke limiter, the crushable body being arranged to reduce in axial length when a length of an extension stroke exceeds a length of a retraction stroke to maintain the length of the return stroke.

The crushable body may be between the piston and the piston stroke limiter.

The crushable body may be a sleeve surrounding at least part of the piston.

The crushable body may be in the piston cylinder.

Expansion of the crushable body in a radial direction may be constrained by the piston. Expansion of the crushable body in a radial direction may be constrained by the housing.

The crushable body may comprise a thin walled structure.

The crushable body may comprise a plurality of collapsible walls extending in an axial direction. The crushable body may comprise a plurality of collapsible walls extending in a plane extending in an axial extending plane.

The crushable body may comprise a tubular member.

The crushable body may comprise a honeycomb, corrugated or lattice structure.

The crushable body may comprise a plurality of crushable members.

The crushable body may comprise an inner wall and the plurality of crushable members may be disposed about the inner wall.

The crushable body may comprise an outer wall at least partially surrounding the plurality of crushable members The crushable members may be tubular.

The crushable body may be arranged to progressively deform over a plurality of stroke cycles of the piston.

The piston assembly may comprise an extension stroke stop and a retraction stroke stop, wherein the piston stroke limiter comprises a limiting member movable in an axial direction between the extension stroke stop and the retraction stroke stop.

The extension stroke stop and the retraction stroke stop may be formed by the housing.

The piston may extend through the crushable body

The piston assembly may comprise a retraction biasing member arranged to bias the piston stroke limiter from an extended position to a retracted position.

The retraction biasing member may be a helical compression spring.

According to an aspect of the disclosure, there is provided an adjuster assembly for maintaining a release clearance between selectively engageable friction parts to compensate for wear in the frictional parts, the assembly comprising a stroke limiter configured to limit the length of a stroke of an extendable member between an extended stroke position and a retracted stroke position; and a crushable body arranged to act between the piston and the piston stroke limiter and configured to be at least partially crushed to reduce the axial length of the crushable body in response to an extension stroke movement due to wear of the frictional parts exceeding a retraction stroke movement.

According to an aspect of the disclosure, there is provided a cartridge for an adjuster assembly of a piston assembly comprising a crushable body arranged to reduce in axial length when compressed in an axial direction.

According to an aspect of the disclosure, there is provided a piston assembly comprising a cartridge for an adjuster assembly with a crushable body arranged to reduce in axial length when compressed in an axial direction According to an aspect of the disclosure, there is provided a brake system for an aircraft comprising at least one of a piston assembly as recited above, an adjuster assembly as recited above, and a cartridge as recited above.

According to an aspect of the disclosure, there is provided a method of assembling a piston assembly comprising: receiving a piston in a piston cylinder of a housing through a first side of the housing in a first direction; receiving an adjuster assembly comprising a crushable body on the piston in the first direction; and enclosing the piston cylinder at the first side.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

DETAILED DESCRIPTION

Figure 1:
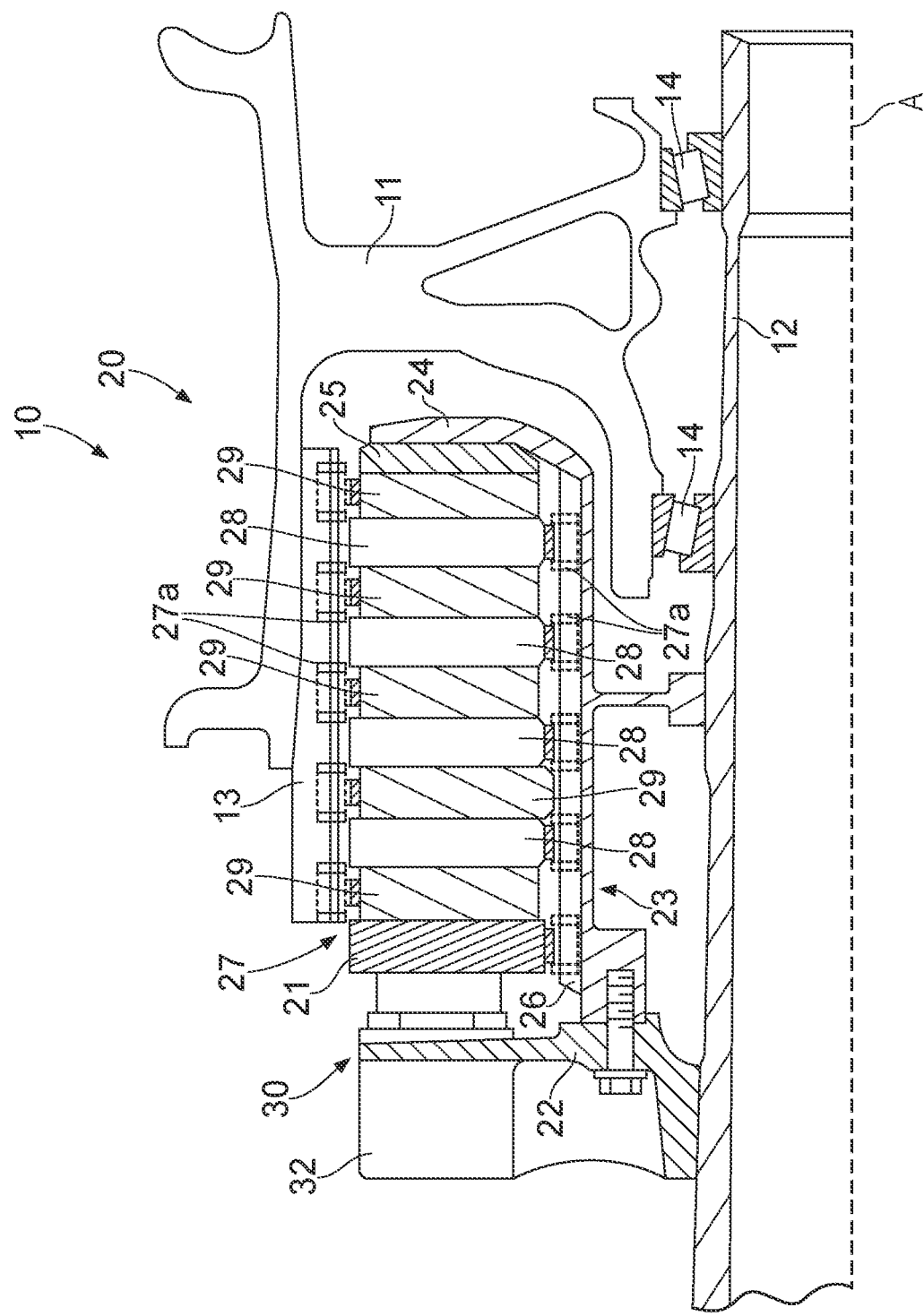
FIG. 1 is a schematic side view of a multi disc brake system.

With reference to FIG. 1, a brake system 10 is described below. The brake system 10 is a multi-disc brake system. The brake system 10 comprises a friction brake assembly 20 and piston assemblies 30. One of a plurality of piston assemblies 30 is shown, and the number of piston assemblies 30 may differ and may be a single piston assembly 30. The piston assembly 30 is arranged to act on the brake assembly 20 to actuate a braking action.

The brake system 10 is operable to restrict rotation of an aircraft wheel 11. The wheel 11 includes a series of axially extending rotor splines 13 (one shown). Wheel 11 is supported for rotation about an axle 12 by bearings 14. Axle 12 defines an axis A of the brake system 10 and of various components thereof. Reference to the terms axis and axial may include an axis of rotation defined by axle 12 or a dimension parallel to such axis.

The brake assembly 20 includes pressure plate 21, flange 22, torque tube 23, and end plate 24. Torque tube 23 may be an elongated annular structure that includes a reaction plate 25 and a series of axially extending stator splines 26 (one shown). The brake assembly 20 also includes a plurality of friction disks 27. These comprise at least one non-rotatable friction disk (stator) 28, and at least one rotatable friction disk (rotor) 29. The friction disks 27 each include an attachment structure 27a.

The flange 22 is fixedly mounted to the axle 12. The pressure plate 21 is also non-rotatable. The piston assemblies 30 are connected to the flange 22 at circumferentially spaced positions around the flange 22. The piston assemblies 30 face axially toward the wheel 10 and contact a side of pressure plate 21. The piston assemblies 30 are hydraulically powered, however they may be powered mechanically, electrically, or pneumatically. The piston assemblies 30 are configured to exert a force on the friction disks 27 towards reaction plate 25. Actuation of the piston assemblies 30 causes the rotors 29 and stators 28 to be pressed together between the pressure plate 21 and the end plate 24. Although the piston assemblies 20 are shown as part of brake system 10, it is contemplated that the piston assemblies, as disclosed herein, may be employed in a variety of other systems. For example, piston assemblies 30 may be employed in a multi-disk clutch system.

One of the piston assemblies 30 is described in further detail below with reference to FIGS. 2 to 7. The piston assembly 30 includes a piston 31. The piston 31 is configured to translate axially within a piston housing 32. The piston assembly comprises an adjuster assembly 50. The adjuster assembly 50 includes adjuster sleeve 51. The piston 31 may telescope relative to adjustor sleeve 51. The adjustor assembly 50 is located within the housing 32.

The piston housing 32 includes a main housing body 33 and end cap 34. The end cap 34 is secured to the main housing body 33. The end cap 34 is threadingly engaged over an open end of the main housing body 33 to close the end. The main housing body 33 defines a chamber 35. The piston 31 is at least partially received in the chamber 35.

The housing 32 defines a piston cylinder. The piston cylinder is formed by the chamber 35 and defines an axis B of the piston assembly 30. The piston 31 is translatable in a longitudinal direction along axis B in the piston cylinder. The chamber 35 comprises an interior wall 42. Interior wall 42 is a circumferentially extending wall. An end wall 43 defines a closed end of the chamber 35. The end cap 34 is at a distal end of the chamber 35 to the end wall 43 and comprises an opening 44. The opening 44 is arranged to lie on axis B.

The piston 31 is received in the chamber 35. The piston 31 has a piston head 36 and a piston rod 37. The piston rod 37 extends from the piston head 36. The piston rod 37 is elongate and extends from the housing 32. The piston rod 37 has a smaller diameter than the interior wall 42. A peripheral cavity 45 is defined in the chamber 35 between the piston rod 37 and the interior wall 42. The peripheral cavity 45 extends annularly around the piston rod 37. A protruding end 38 of the piston rod 37 protrudes from the housing 32. The protruding end 38 extends through the opening 44 to external of the housing 32.

A disc 39, also known as an insulator, is on the protruding end 38 of the piston rod 37. The disc 39 is secured to the end of the protruding end 38 and moves together with the piston rod 37. The disc 39 comprises an engaging surface 39a. The engaging surface 39a is arranged to move into and out of engagement with the friction break assembly 20. The engaging surface 39a of the disc 39 is arranged to contact and bias pressure plate 21 when moved into engagement in dependence on operation of piston assembly 30.

An end cavity 40 is defined between the piston head 36 and the end wall 43 of the chamber 35. The end cavity 40 is defined at least partially by the end wall 43 and a piston head crown 36a of the piston 31. A brake or working fluid, for example hydraulic fluid, is receivable in a volume defined by the end cavity 40. The end cavity 40 may be at least partially defined in the piston head 36. A fluid supply (not shown) is arranged to supply working fluid to the volume.

A seal 41 extends around the piston head 36. The seal 41 is a slidable seal which is configured to slide along and seal with the interior wall 42 of the housing 32. The seal 41 comprises an o-ring 41a, however alternative sealing arrangements may be provided. The seal 41 provides a fluid seal between the end cavity 40 and the peripheral cavity 45. The seal 41 is an annular seal. The arrangement of the piston 31 and the adjuster assembly 50 with the housing 32 mean that a single sealing arrangement provided by seal 41 is required to fluidly seal between the adjuster assembly 50 and the end cavity 40. As such, a simple sealing configuration of the piston assembly 30 is provided. Working fluid in the end cavity 40 is prevented from flowing to the peripheral cavity 45 by the seal 41.

Figure 2:
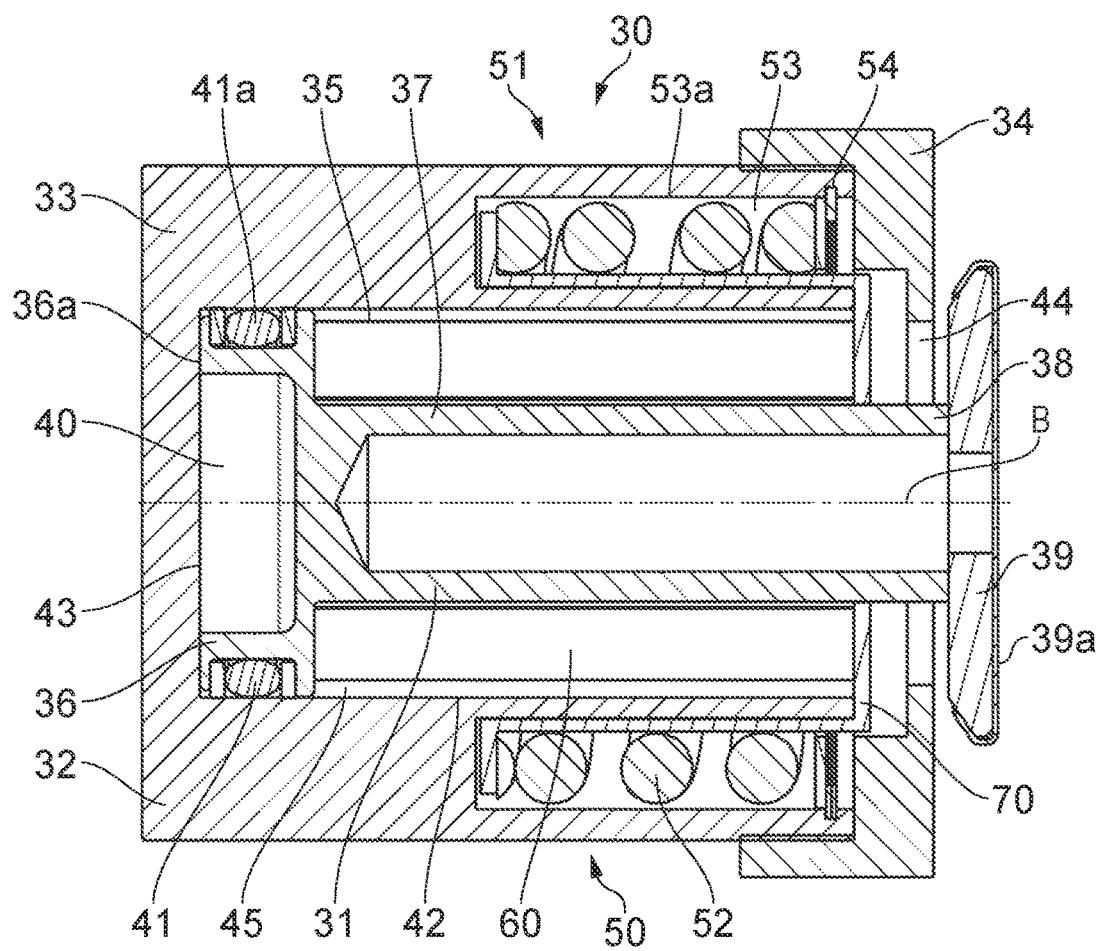
FIG. 2 is a cross-sectional schematic side view of a piston assembly of the multi disc brake system.
Figure 4:
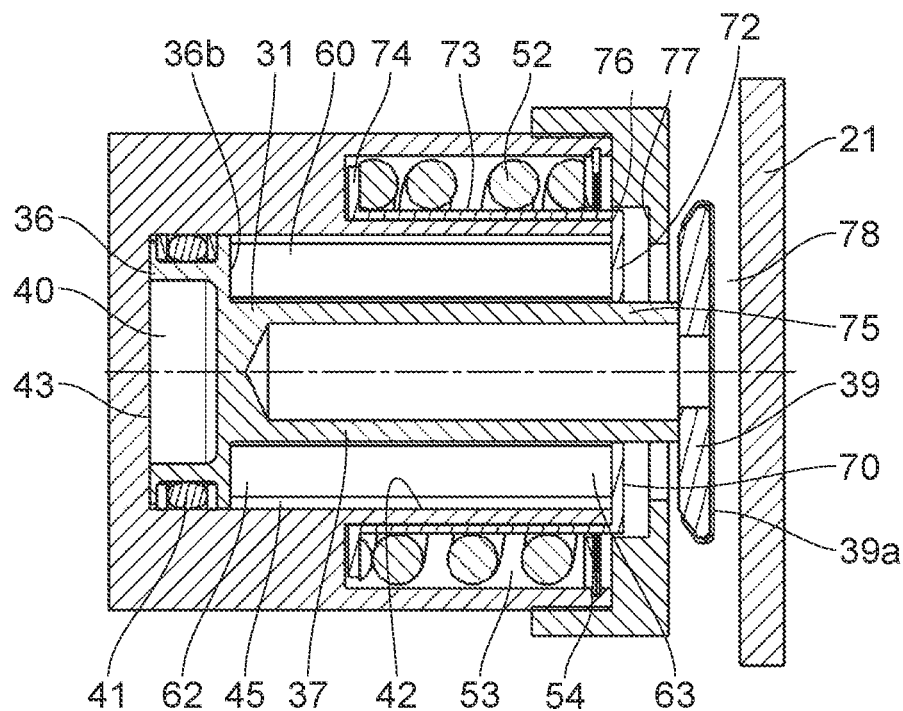
FIG. 4 is a cross-sectional schematic side view of the piston assembly in a first retracted position.
Figure 6:
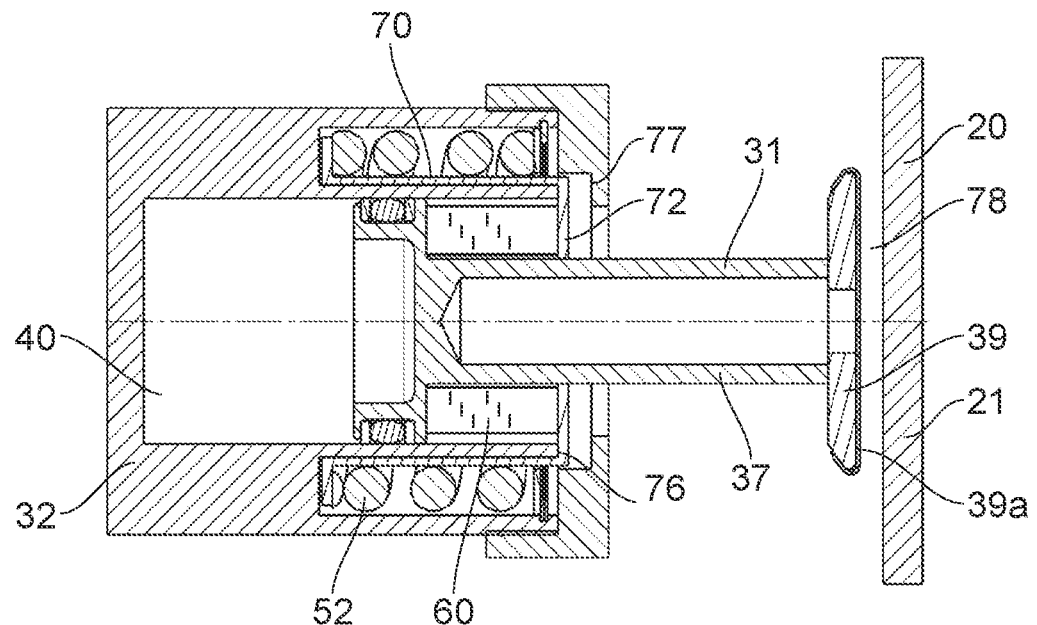
FIG. 6 is a cross-sectional schematic side view of the piston assembly in a second retracted position.

The piston assembly 30 includes the adjustor assembly 50. The adjustor assembly 50 is received in the housing 32. The adjuster assembly 50 extends in an axial direction. The adjuster assembly 50 includes a spring 52, a crushable body 60 and a piston stroke limiter 70. The spring 52 is a biasing member which is arranged to bias the piston 31 into a retracted stroke position, for example as shown in FIGS. 2, 4 and 6. The retracted stroke position is a position in which the piston 31 has moved in a retracted position into the piston chamber.

The spring 52 is a helical spring. The spring 52 is a compressive spring. The housing 32 includes an outer chamber 53. The outer chamber 53 is an annular chamber and extends in a longitudinal direction about axis B. The outer chamber 53 is in the main housing body 33 and is accessible at the open end thereof when the end cap 34 is removed. The end cap 34 closes the outer chamber 53. The spring 52 is received in the outer chamber 53. The spring 52 is retained in the outer chamber 53 by a spring clip 54. The spring clip 54 is an annular clip received in an annular channel in an outer wall 53*a* of the outer chamber 53. It will be understood that in an alternative arrangement the spring 52 is retained in the outer chamber 53 by the end cap 34.

Figure 3:
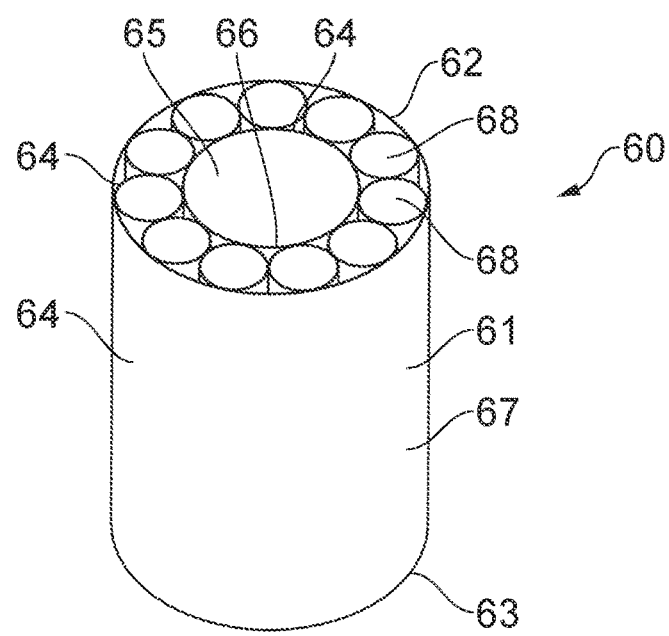
FIG. 3 is a perspective schematic view of a crushable cartridge of an adjuster assembly.

The crushable body 60 will now be described in detail with reference to FIGS. 3 and 4 in particular. The crushable body 60 comprises a thin walled structure 61. The crushable body 60 is received in the peripheral cavity 45. Crushable body 60 forms a sleeve through which the piston 31 extends. When assembled, the crushable body 60 is received between the piston rod 37 and the interior wall 42 of the housing 32. Crushable body 60 is elongate. In an uncrushed condition the crushable body 60 defines a gap between the piston rod 37 and the interior wall 42 around all or a substantive portion of its circumference. This provides for radial expansion of the crushable body 60 when the crushable body is at least partially in a crushed condition.

The crushable body 60 extends in an axial direction in the housing 32. The crushable body 60 has a first end 62 and a second end 63. The first end 62 abuts a rear side 36*b* of the piston head 36. The second end 63 abuts the piston stroke limiter 70. As such, the crushable body 60 is received between the piston 31 and the piston stroke limiter 70 in an axial direction.

The thin walled structure 61 includes thin walled members 64. The thin walled members 64 extend in an axial direction between the first end 62 and the second end 63. The thin walled members 64 are collapsible in an axial direction when the crushable body 60 is compressed in the axial direction between the first and second ends 62, 63. The crushable body 60 defines a tubular arrangement with a bore 65 through which the piston rod 37 is extendible.

The thin walled members 64 include an inner wall 66 and an outer wall 67. The inner and outer walls 66, 67 are tubular. An annular channel is defined between the inner and outer walls 66, 67. Crushable members 68 are received between the inner and outer walls 66, 67. The inner and outer walls 66, 67 also form crushable members. The crushable members 68 extend in the axial direction. The crushable members 68 comprise thin walls extending in an axial direction. The crushable members 68 are tubular members. The plurality of tubular members acting as crushable members, are disposed about the inner wall 66. The crushable members 68 extend between the inner and outer walls 66, 67. The crushable members 68 are arranged in a circumferential array with adjacent crushable members 68 in contact with each other.

It will be understood that the arrangement of the crushable body 60 may differ. For example, one or both of the inner and outer walls 66, 67 may be omitted. The crushable members 68 may have a different configuration. For example, the crushable members 68 in one embodiment may comprise ribs. Such ribs may be disposed on planes extending in the radial and axial directions.

The term thin walled is used herein to describe elements that have a small thickness in comparison to other dimensions such as length and width. Such elements are deformable in a controlled manner when a compressive force is applied to opposing, distal ends of the element. It will be understood that the thickness of the wall will be dependent on the compressive force required to crush the body 60 as well as the arrangement of the crushable members, including the number of crushable members. In the present arrangement, it is anticipated that the thickness of the walls of the crushable members is in the range of 0.1 mm-0.3 mm. The walls may be a sheet material, with a thickness of less than 6 mm. It will also be understood that the material of the crushable body 60 may differ, in the present arrangement the crushable body 60 is formed from a ductile metal sheet arrangement, such as stainless steel for example. Other materials include plastics, composites and foam.

A crushable body is intended to mean a body which is able to reduce in axial length when a compressive force is applied to the crushable body in the axial direction. Upon application of a compressive force in the axial direction above a predetermined value the body reduces in axial length in a controlled manner, but does not collapse. Such an arrangement is non-resilient, that is, upon release of or reduction of the compressive force on the crushable body, the body 60 does not substantially expand in axial length. Although in the arrangement described herein the crushable body 60 is formed by thin walled members 64, it will be understood that alternative arrangements are possible, for example at least one or all of the crushable members 68 may be replaced by a non-thin walled crushable configuration, for example a crushable foam material. In the present embodiments, the crushable body is formed from sheet material, however other configurations are possible.

The crushable body 60 and the piston stroke limiter 70 are housed in the housing 32.

The piston stroke limiter 70 includes a limiting member 72, a guide collar 73 and a biasing flange 74. The limiting member 72 acts to limit the stroke length of the piston stroke limiter 70 and therefore the piston 31. The guide collar 73 acts to guide the piston stroke limiter 70 in an axial direction during movement of the piston stroke limiter 70. The biasing flange 74 engages with the spring 52 and is biased by the spring to bias the piston stroke limiter 70 into a retracted stroke position.

The piston stroke limiter 70 transfers the force applied by the piston and the spring 52 between the components. The guide collar 73 is tubular with the biasing flange 74 at one end and the limiting member 72 at the other end of the guide collar 73. The biasing flange 74 extends radially outwardly from the guide collar 73 and extends circumferentially around the guide collar 73. The limiting member 72 extends radially inwardly from the guide collar 73 and extends circumferentially at an opposing end of the guide collar 73. An aperture 75 is defined by the limiting member 72. The aperture 75 is configured to receive the piston rod 37 therethrough. The piston rod 37 is slidable in the aperture 75.

The limiting member 72 is received in the housing between a retraction stroke stop 76 and an extension stroke stop 77. The limiting member 72 is moveable in an axial direction between the retraction stroke stop 76 and the extension stroke stop 77. The retraction and extension stroke stops 76, 77 limit the axial movement of the piston stroke limiter 70. The retraction stroke stop 76 and the extension stroke stop 77 are spaced apart from each other in the axial direction. The spacing together with the thickness of the limiting member 72 defines the stoke length of the piston stroke limiter 70. The retraction stroke stop 76 is defined by a radial surface of the main housing body 33. The extension stroke stop 77 is defined by a radial surface of the end cap 34. It will be understood that the configuration of the stoke stops 76, 77 may differ. The limiting member 72 is at a distal end of the piston cylinder to the piston head 36.

The guide collar 73 of the limiting member 72 extends in the outer chamber 53. The biasing flange 74 is also disposed in the outer chamber 53. The spring 52 is received between the biasing flange 74 and the spring clip 54.

Assembly of the piston assembly 30 will now be described. The piston 31 is received in the housing 32. The piston head 36 is received in the chamber 35 proximal to the end wall 43. The seal 41 seals against the interior wall 42 to define the end cavity 41 and the peripheral cavity 45 by means of a fluid seal. The fluid path (not shown) is provided to supply a pressurized working fluid to the end cavity 40. The fluid supply controls the hydraulic force applied to the piston 31. Supply of the working fluid to end cavity 40 biases the piston 31 towards an extended stroke position; that is movement in a left to right direction as shown in the Figures.

The crushable body 60 is received over the piston 31 with the piston rod 37 extending through the bore 65 of the crushable body 60. The first end 62 of the crushable body 60 abuts against the rear side 36b of the piston head 36. The piston stroke limiter 70 is received in the housing 32. The biasing flange 74 and the guide collar 73 of the piston stroke limiter 70 are received in the outer chamber 53. The limiting member 72 protrudes in the piston cylinder and abuts with the second end 63 of the crushable body. The crushable body 60 is therefore received between the piston stroke limiter 70 and the piston 31. The piston rod extends from the piston stroke limiter through the aperture 75.

The spring 52 is received in the housing 32 and abuts against the biasing flange 74. The spring 52 is retained by spring clip 54. The spring 52 biases the biasing flange 74, and therefore the piston stroke limiter 70 into a retracted position. The spring 52 biases the piston stroke limiter 70 against the retraction stroke stop 76. The retraction stroke stop 76 limits movement of the piston stroke limiter 70 in a retraction direction. The action of the spring 52 on the piston stroke limiter 70 biases the piston 31 into a retracted stroke position acting through the crushable body 60. As such, in a neutral condition, in which the hydraulic pressure applied to the piston assembly 30 is less than the force exerted by the spring 52, the piston 31 is biased into the retraction position. The retraction position is limited by the limiting member 72 abutting the retraction stroke stop 76. The end cap 34 is assembled on the main body housing 33. The disc 39 forming the engaging surface 39a is assembled on the protruding end 38 of the piston 31. The protruding end 38 and disc 39 protrude from the housing 32.

The piston assembly 30 is assembled with the friction brake assembly 20. The disc 39 is disposed adjacent to but spaced from the pressure plate 21 as shown in FIG. 4. A gap defining a release clearance 78 is defined between the engaging surface 39a and the pressure plate 21. Such a release clearance 78 is predetermined.

Operation of the piston assembly 30 will now be described with reference to FIGS. 4 to 7. As shown in FIG. 4, the piston 31 is initially in its neutral position with the piston 31 in the retracted stroke position and the predetermined release clearance 78 being formed between the disc 39 and the pressure plate 21. The disc 39 and pressure plate 21 act as selectively engageable parts. Components of the brake assembly 20 act as selectively engageable parts in dependence of the action of the piston assembly 30. The spring 52 biases the piston 21 into the retracted stroke position by means of the piston stroke limiter 70 and crushable body 60 through which the biasing force acts. The release clearance 78 is initially set to be equal to or less than the gap between the limiting member 72 and the extension stroke stop 77 when the piston stroke limiter 70 is in its retracted stroke position.

Figure 5:
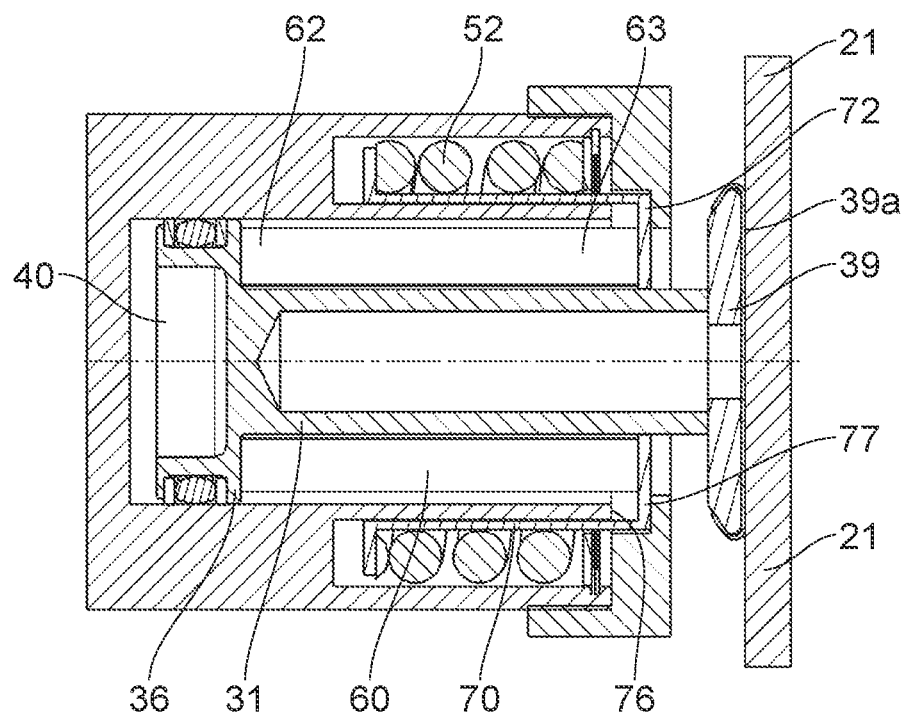
FIG. 5 is a cross-sectional schematic side view of the piston assembly in a first extended position.

Upon actuation of the piston assembly 30 a hydraulic force is applied to the piston head 36 through supply of pressurized fluid to the end cavity 40. The piston 31 is urged to move and so translate along in an axial direction from the retracted stroke position to an extended stroke position as shown in FIG. 5. The piston 31 translates in the axial direction until the engaging surface 39a of disc 39 engages with the pressure plate 21 and causes actuation of the friction brake assembly 20. The force required to crush the crushable structure is greater than the force generated by the spring 52 and less than a maximum force which can be generated by pressurized fluid. The force required to actuate the friction brake assembly 20 to cause the predetermined braking effect is less than the compressive force required to cause crushing action of the crushable body 60. The compressive force required to cause a crushing of crushable body 60 is less than the maximum force that may be applied to the piston 31 and the maximum actuating force that may be applied by the piston to the friction brake assembly 20.

When the actuation of the friction brake assembly 20 is no longer required, the actuating force applied by the working fluid supply on the piston 31 is removed. As such, the biasing force of the spring 52 exceeds the actuating force applied on the piston 31 and the piston 31 is urged to move from its extended stroke position to the retracted stroke position. Such stroke actions may be performed in a plurality of cycles.

As the components of the friction brake assembly wear, such wear is required to be compensated in order to maintain the length of the piston stroke over repeated cycles, and in particular release clearance 78 irrespective of the extent of the wear. When such wear occurs, initially the piston 31 will move from its retracted stroke position when pressure is applied and overcomes the biasing force of the spring 52 to reduce the clearance between the disc 39 and the pressure plate 21. This movement is limited by the action of the piston stroke limiter 70, with the limiting member 72 abutting the extension stroke stop 77.

If wear has occurred then the actuating stroke length is greater than the stroke length of the piston stroke limiter 70. When this occurs, the actuating force applied to the piston increases and applies a compressive force on the crushable body 60 above a predetermined crush limit between the piston head and the limiting member 72 abutting the extension stroke stop 77. When this force exceeds the resistance to crushing of the crushable body 60 then the crushable body 60 is caused to crush and so reduce in axial length as a result of the partial deformation of the thin walled structure 61 until the required engagement provided by disc 39 with the friction brake assembly 20 to cause the braking action. At this point, axial movement of the piston 31 is prevented due to the reaction force of the friction brake assembly 20.

Upon release of the actuating force on the piston 31, then the biasing force of the spring 52 exceeds the actuating force and urges the piston stroke limiter 70, the crushable body 60 and piston 31 away from the extended stroke position, into the retracted stroke position. As the crushable body 60 is non-resilient, then the reduced axial length of the crushable body 60 is maintained. As such, the release clearance 78 is defined by the movement of the limiting member 72 from contact with the extension stroke stop 77 to contact with the retraction stroke stop 76. As such, the release clearance 78 in the retracted stroke position is maintained. The gap between the limiting member 72 and the stops 72 corresponds to the release clearance 78.

Figure 7:
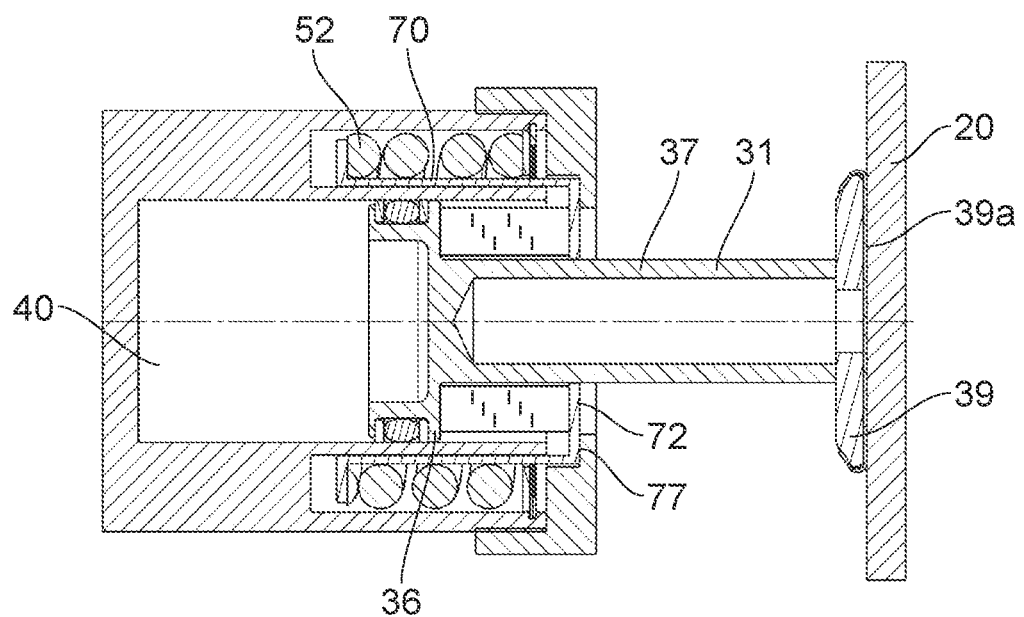
FIG. 7 is a cross-sectional schematic side view of the piston assembly in a second extended position.

Upon continued operating cycles of the piston assembly 30, and therefore the brake system 10, wear of the discs of the friction brake assembly 20 continues. Upon each cycle, the compression of the crushable body 60 in the axial direction, and therefore the reduction in the axial length of the crushable body 60 corresponds to the wear of the friction brake assembly 20. The prescribed clearance is reestablished upon return of the piston assembly 30 to the retracted stroke position. Such continued wear causes the piston 31 to telescope from the housing 32 relative to the adjuster sleeve 51 of the adjuster assembly 50 and the piston stroke limiter 70 as shown in FIGS. 6 and 7 in which the release clearance 78 is maintained in the retracted stroke position in FIG. 6, and the disc 39 engages with the friction brake assembly 20 in the extended stroke position as shown in FIG. 7.

The crushable body 60 is constant along its axial length. As the crushable body 60 is crushed and therefore reduces in its axial length the force required to crush the crushable body 60 is stable over the crushable length and therefore the force required to maintain the release clearance 78 is stable. With the arrangement of the crushable body 60 the stroke length possible is maximized within the same envelope of the housing. The ratio of maximum adjustment length to physical assembly length is maximized.

The fully crushed crushable body 60 prevents under adjustment of fully worn brakes. The adjustment force increases in the event of over-adjustment of the system. To replace the fully crushed crushable body 60, the disc 39, end cap 34, piston stroke limiter 70 and used crushable body 60 are all removed from the same end of the piston assembly 30 without the need to remove the piston 31 from the housing 32. As such, ease of maintenance of the piston assembly 30 is maximized. The number of parts of the system is minimized.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the claims. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A piston assembly for engaging two selectively engageable parts comprising:
   a housing defining a piston cylinder, the housing comprising a main body housing defining a chamber and an end cap positioned at a distal end of the chamber of the main body housing adjacent to a pressure plate;
   a piston positioned within the chamber; and
   an adjuster assembly comprising:
      a piston stroke limiter configured to limit a length of a return stroke of the piston from an extended stroke position and a retracted stroke position;
      a crushable body acting between the piston and the piston stroke limiter, the crushable body being arranged to reduce in axial length when a length of an extension stroke exceeds a length of a retraction stroke to maintain the length of the return stroke; and
      an extension stroke stop defined by a radial surface of the end cap and a retraction stroke stop defined by a radial surface at the distal end of the chamber of the main body housing adjacent to the pressure plate, wherein the piston stroke limiter comprises a limiting member movable in an axial direction between the extension stroke stop and the retraction stroke stop.

2. The piston assembly of claim 1, wherein the crushable body is between the piston and the piston stroke limiter.

3. The piston assembly of claim 1, wherein the crushable body is a sleeve surrounding at least part of the piston.

4. The piston assembly of claim 1, wherein the crushable body is in the piston cylinder.

5. The piston assembly of claim 1, wherein the crushable body comprises a thin walled structure.

6. The piston assembly of claim 5, wherein the crushable body comprises a plurality of collapsible walls extending in an axial direction.

7. The piston assembly of claim 1, wherein the crushable body comprises a tubular member.

8. The piston assembly of claim 1, wherein the crushable body comprises a plurality of crushable members.

9. The piston assembly of claim 8, wherein the crushable body comprises an inner wall and the plurality of crushable members are disposed about the inner wall.

10. The piston assembly of claim 9, wherein the crushable members are tubular.

11. A brake system for an aircraft comprising at least one piston assembly of claim 1, the piston assembly including an adjuster assembly for maintaining a release clearance between selectively engageable parts to compensate for wear in the parts, the adjuster assembly comprising:
    a piston stroke limiter configured to limit the length of a stroke of an extendable member between an extended stroke position and a retracted stroke position;
    a crushable body arranged to act between the piston and the piston stroke limiter and configured to be at least partially crushed to reduce the axial length of the crushable body in response to an extension stroke movement due to wear of the parts exceeding a retraction stroke movement; and
    a cartridge for use with the adjuster assembly of the piston assembly, the cartridge comprising a crushable body arranged to reduce in axial length in response to compression in an axial direction.

12. An adjuster assembly for maintaining a release clearance between selectively engageable parts to compensate for wear in the parts, the assembly comprising:
    a piston stroke limiter configured to limit the length of a stroke of an extendable member between an extended stroke position and a retracted stroke position;
    a cartridge including a crushable body arranged to reduce in axial length when compressed in an axial direction, wherein the crushable body is arranged to act between a piston and the piston stroke limiter and configured to be at least partially crushed to reduce the axial length of the crushable body in response to an extension stroke movement due to wear of the parts exceeding a retraction stroke movement, wherein the piston is positioned within a chamber defined by a main body housing and an end cap is positioned at a distal end of the main body housing adjacent to a pressure plate; and an extension stroke stop defined by a radial surface of the end cap and a retraction stroke stop defined by a radial surface at the distal end of the chamber of the main body housing adjacent to the pressure plate, wherein the piston stroke limiter comprises a limiting member movable in an axial direction between the extension stroke stop and the retraction stroke stop.

* * * * *